US012530917B2

(12) United States Patent
Kim et al.

(10) Patent No.: US 12,530,917 B2
(45) Date of Patent: Jan. 20, 2026

(54) TEXT DATA STRUCTURING METHOD AND APPARATUS USING LINE INFORMATION

(71) Applicant: 42Maru Inc., Seoul (KR)

(72) Inventors: Dong Hwan Kim, Seoul (KR); You Kyung Kwon, Seoul (KR); So Young Ko, Seoul (KR); Ki Beom Kwon, Gyeonggi-do (KR); Da Hea Moon, Goyang-si (KR); Yeo Sol Lim, Seoul (KR)

(73) Assignee: 42Maru Inc., Seoul (KR)

( * ) Notice: Subject to any disclaimer, the term of this patent is extended or adjusted under 35 U.S.C. 154(b) by 733 days.

(21) Appl. No.: 17/896,238

(22) Filed: Aug. 26, 2022

(65) Prior Publication Data

US 2024/0062572 A1 Feb. 22, 2024

(30) Foreign Application Priority Data

Aug. 18, 2022 (KR) ........................ 10-2022-0103265

(51) Int. Cl.
*G06V 30/413* (2022.01)
*G06F 16/31* (2019.01)
(Continued)

(52) U.S. Cl.
CPC .......... *G06V 30/413* (2022.01); *G06F 16/316* (2019.01); *G06F 16/3347* (2019.01);
(Continued)

(58) Field of Classification Search
CPC ........ G06V 10/82; G06V 20/70; G06V 30/18; G06V 30/1916; G06V 30/262;
(Continued)

(56) References Cited

U.S. PATENT DOCUMENTS 10,872,236 B1 * 12/2020 Elor .................. G06V 30/1452
11,120,256 B2 * 9/2021 Prasad ................ G06V 30/153
(Continued)

FOREIGN PATENT DOCUMENTS

KR 10-2048638 B1 11/2019
KR 10-2022-0072669 A 6/2022

OTHER PUBLICATIONS

Wikipedia, "Semantic similarity", Last edited on Jan. 8, 2018 (13 pages) , Accessed via the Internet: https://en.wikipedia.org/w/index.php?title=Semantic_similarity&oldid+819210970.
(Continued)

*Primary Examiner* — Jennifer Mehmood
*Assistant Examiner* — Jose M Torres
(74) *Attorney, Agent, or Firm* — Sughrue Mion, PLLC

(57) ABSTRACT

A text data structuring apparatus according to the present invention includes: a data extraction unit which extracts text included in an image and position information of the text on the basis of OCR; a data processing unit which extracts line information included in the image by using the text, the position information, and the image; a labeling unit which labels the text as keys or values; and a relationship identification unit which acquires a mapping candidate group including first text, second text, and third text labeled on the basis of the line information, calculates a first similarity score representing meaning similarity between the first text and the third text and a second similarity score representing meaning similarity between the second text and the third text, and decides text to be mapped with the third text among of the first text and the second text.

10 Claims, 7 Drawing Sheets

TEXT STRUCTURING APPARATUS
DATA EXTRACTION UNIT[100]
DATA PROCESSING UNIT[200]
FORM CLASSIFICATION UNIT[300]
LABELING UNIT[400]
RELATIONSHIP IDENTIFICATION UNIT [500]
MISRECOGNITION CORRECTION UNIT[600]
DATABASE[700]

(51) Int. Cl.

| | |
|---|---|
| ***G06F 16/334*** | (2025.01) |
| ***G06F 16/583*** | (2019.01) |
| ***G06F 18/22*** | (2023.01) |
| ***G06F 40/117*** | (2020.01) |
| ***G06F 40/279*** | (2020.01) |
| ***G06V 10/82*** | (2022.01) |
| ***G06V 20/70*** | (2022.01) |
| ***G06V 30/18*** | (2022.01) |
| ***G06V 30/19*** | (2022.01) |
| ***G06V 30/262*** | (2022.01) |
| ***G06V 30/412*** | (2022.01) |
| ***G06V 30/414*** | (2022.01) |
| ***G06V 30/42*** | (2022.01) |

(52) U.S. Cl.
CPC .......... *G06F 16/5846* (2019.01); *G06F 18/22* (2023.01); *G06F 40/117* (2020.01); *G06F 40/279* (2020.01); *G06V 10/82* (2022.01); *G06V 20/70* (2022.01); *G06V 30/18* (2022.01); *G06V 30/19093* (2022.01); *G06V 30/1916* (2022.01); *G06V 30/262* (2022.01); *G06V 30/412* (2022.01); *G06V 30/414* (2022.01); *G06V 30/42* (2022.01)

(58) Field of Classification Search
CPC .. G06V 30/412; G06V 30/413; G06V 30/414; G06V 30/42; G06V 30/19093; G06F 16/316; G06F 16/3347; G06F 16/35; G06F 16/5846; G06F 16/93; G06F 18/22; G06F 40/117; G06F 40/279
See application file for complete search history.

(56) References Cited

U.S. PATENT DOCUMENTS

| | | | | |
|---|---|---|---|---|
| 11,450,126 | B1 * | 9/2022 | Yu | G06F 18/22 |
| 11,756,321 | B2 * | 9/2023 | Tatsumi | G06F 18/217<br>382/161 |
| 12,033,413 | B2 * | 7/2024 | Kim | G06V 30/12 |
| 12,277,786 | B2 * | 4/2025 | Arroyo | G06V 30/153 |
| 12,307,801 | B2 * | 5/2025 | Lingineni | G06V 30/412 |
| 2008/0152238 | A1 * | 6/2008 | Sarkar | G06V 30/40<br>382/228 |
| 2011/0280481 | A1 * | 11/2011 | Radakovic | G06V 10/987<br>382/311 |
| 2017/0075974 | A1 * | 3/2017 | Shetty | G06F 40/174 |
| 2019/0171792 | A1 * | 6/2019 | Manica | G06F 40/284 |
| 2019/0171872 | A1 * | 6/2019 | Northrup | G06F 16/284 |
| 2020/0074169 | A1 * | 3/2020 | Mukhopadhyay | G06F 18/22 |
| 2020/0273078 | A1 * | 8/2020 | Xu | G06V 30/412 |
| 2021/0374395 | A1 | 12/2021 | Tata et al. | |
| 2022/0245377 | A1 | 8/2022 | Singh et al. | |

OTHER PUBLICATIONS

Lulu Wan, et al., "Long-length Legal Document Classification", arXiv:1912.06905v1 [cs.CL], Dec. 14, 2019 (8 pages).

Bkgrrl00, "PDFminer only works if PDF is first made searchable", Comments opened on Feb. 26, 2020, Issue No. 377 (2 pages), Accessed via the Internet: https://github.com/pdfminer/pdfminer.six/issues/377.

Extended European Search Report issued Jul. 6, 2023 in European Application No. 22192064.8.

Office Action issued Jun. 27, 2025 in Korean Patent Application No. 10-2022-0103265.

* cited by examiner

FIG. 2

COMMERCIAL INVOICE (1) SHIPPER / EXPORTER
ABC CORPORATINON
120, SAMSUNG-DONG, GANGNAM-GU,
SEOUL, SOUTH KOREA
TEL: +82-2-000-0000 / FAX: +82-2-000-0000

(8) NO. & DATE OF INVOICE
ABCC12015-001 MAY 19, 2015

(9) NO. & DATE OF L/C
T/T REMITTANCE BEFORE SHIPMENT (2) BUYER / IMPORTER
DEF CORPORATINON
110, FLOWER ROAD,
NEW YORK, U.S.A
TEL: +1 - 123 - 456789

(10) NOTIFY PARTY
SAME AS CONSIGNEE (3) CONSIGNEE
SAME AS ABOVE

(11) REMARKS
1) FREIGHT COLLECT BY OCEAN
2) H. S. CODE NO. : 1234-00-0000
3) NO. OF BILL OF LADING : ABC912345678

(4) PORT OF LOADING
BUSAN, SOUTH KOREA (5) FINAL DESTIANTION
NEW YORK, U.S.A (6) CARRIER
HAPPY VESSEL V. 50E (7) SAILING ON OR ABOUT
MAY 25, 2015

| (12) MARKS AND NO. PKGS | (13) DESCRIPTION OF GOODS | (14) Q'TY | (15) UNIT PRICE (USD/US$) | (16) AMOUNT (USD/US$) |
|---|---|---|---|---|
| DEF CORP.<br>NEW YORK<br>C/NO. 1~2<br>ITEM NO. | MOTORCYCLE GLOVES | | FOB KOREA | |
| | MG-001 | 1,000 PRS | US$10.50 | US$10,500.00 |
| | MG-002 | 1,000 PRS | US$12.00 | US$12,000.00 |
| | TOTAL: | 2,000 PRS | | US$22,500.00 |

*SAYS : US DOLLARS TWENTY TWO THOUSAND FIVE HUNDRED ONLY.
*ORIGIN OF COUNTRY : REPUBLIC OF KOREA (R. O. K)

(17) TEL. NO. : +82-2-000-0000
FAX NO. : +82-2-000-0000

(18) SIGNED BY (a)

```
{
    "text" : "SHIPPER/ EXPORTER",
    "position" : {
        "bounding_box" : {
            "left" : 309,
            "top" : 30,
            "width" : 549,
            "height" : 24
        },
        "vertices" : [
            {
                "x" : 309,
                "y" : 35
            },
            {
                "x" : 858,
                "y" : 28
            },
            {
                "x" : 858,
                "y" : 44
            },
            {
                "x" : 309,
                "y" : 52
            }
        ]
    }
}
~~syncopation
```

(b)

TEXT DATA STRUCTURING METHOD AND APPARATUS USING LINE INFORMATION

BACKGROUND OF THE INVENTION

Field of the Invention

The present invention relates to a text data structuring method and apparatus, and more specifically, to a text data structuring method and apparatus to improve efficiency of operation management of a document by structuring text included in an unstructured image document.

Description of the Related Art

In the industrial field, there has been a continuous demand to process unstructured documents that are mutually transmitted between individuals, organizations, or different organizations in a form that can be effectively managed and operated. However, there is a disadvantage that a large cost is required for the simple repetitive input process of information due to different document formats and diversity of terms.

SUMMARY OF THE INVENTION

The purpose of the present invention is to solve the above-mentioned problems, and to efficiently perform operation management of image documents through classification of image documents, extraction of text (key and value) in image documents, structuring of text data, correction of misrecognition, and the like.

The problem to be solved by the present invention is not limited to the above-mentioned problems, and the problems not mentioned will be clearly understood by those of ordinary skill in the art to which the present invention belongs from the present specification and the accompanying drawings.

A text data structuring apparatus according to an embodiment of the present invention to achieve such a purpose may include: a data extraction unit which extracts text included in an image and position information of the text on the basis of OCR; a data processing unit which extracts line information included in the image by using the text, the position information, and the image; a form classification unit which classifies a form of the image on the basis of the text; a labeling unit which labels the text as keys or values; and a relationship identification unit which acquires a mapping candidate group including first text, second text, and third text labeled on the basis of the line information, calculates a first similarity score representing meaning similarity between the first text and the third text and a second similarity score representing meaning similarity between the second text and the third text, and decides text to be mapped with the third text among of the first text and the second text on the basis of the first similarity score and the second similarity score.

In addition, a text data structuring method according to an embodiment of the present invention may include: a step of extracting text included in an image and position information of the text on the basis of OCR; a step of extracting line information included in the image by using the text, the position information, and the image; a step of classifying a form of the image on the basis of the text; a step of labeling the text as keys or values; a step of acquiring a mapping candidate group including first text, second text, and third text labeled on the basis of the line information; a step of calculating a first similarity score representing meaning similarity between the first text and the third text and a second similarity score representing meaning similarity between the second text and the third text; and a step of deciding text to be mapped with the third text among of the first text and the second text on the basis of the first similarity score and the second similarity score.

Solutions of the present invention are not limited to the above-described solutions, and solutions not mentioned will be clearly understood by those of ordinary skill in the art to which the present invention belongs from the present specification and the accompanying drawings.

BRIEF DESCRIPTION OF THE DRAWINGS

FIG. 2 is a diagram illustrating an input and an output of a process of extracting text from an image according to an embodiment of the present invention;

DETAILED DESCRIPTION OF THE PREFERRED EMBODIMENTS

Figure 1:
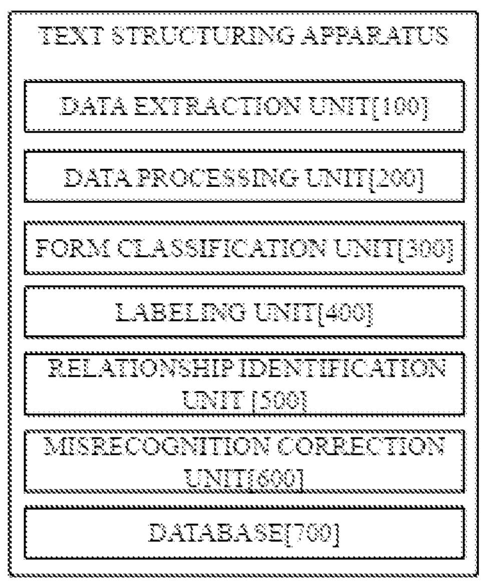
FIG. 1 is a diagram illustrating a schematic structure of a text data structuring apparatus according to an embodiment of the present invention.

The above-described objects, features and advantages will be described below in detail with reference to the accompanying drawings, and accordingly, those skilled in the art to which the present invention pertains will be able to easily implement the technical idea of the present invention. In describing the present invention, if it is determined that a detailed description of a known technology related to the present invention may unnecessarily obscure the gist of the present invention, the detailed description will be omitted.

In the drawings, the same reference numerals are used to refer to the same or similar elements, and all combinations described in the specification and claims may be combined in any manner. In addition, unless otherwise specified, it should be understood that references to the singular may include one or more, and references to the singular expression may also include the plural expression.

The terminology used herein is for the purpose of describing specific exemplary embodiments only and is not intended to be limiting. As used herein, singular expressions may also be intended to include plural meanings unless the sentence clearly indicates otherwise. The term “and/or” includes any and all combinations of the items listed therewith. The terms “include”, “including”, “includes”, “comprising”, “having”, and the like have an implicit meaning. Accordingly, these terms specify the described features, integers, steps, operations, elements, and/or components, and do not exclude the presence or addition of one or more other features, integers, steps, operations, elements, components, and/or groups thereof. The steps, processes, and operations of the method described herein should not be construed as necessarily performing their performance in such a specific order as discussed or exemplified, unless specifically determined to be an order of performance thereof. It should also be understood that additional or alternative steps may be used.

In addition, each of the components may be implemented as a hardware processor, the above components may be integrated into one hardware processor, or the above components may be combined with each other and implemented as a plurality of hardware processors.

Hereinafter, preferred embodiments according to the present invention will be described in detail with reference to the accompanying drawings.

A text data structuring apparatus may include: a data extraction unit which extracts text and position information of the text from an image on the basis of OCR; a data processing unit which generates text units on the basis of the text and the position information; a form classification unit which classifies a form of the image on the basis of the text; a labeling unit which labels the text units as first text to third text corresponding to keys, values, and the like, respectively, on the basis of the classified form; a relationship identification unit which maps and structures the second text corresponding to the first text; and a misrecognition correction unit which determines misrecognition about the first text, and corrects the misrecognition of the first text determined as misrecognition.

According to an embodiment of the present application, the form classification unit may classify a form by searching the text in a search engine, which may include a plurality of form samples and label a form most similar to the text.

According to an embodiment of the present application, the data processing unit may set text, in which a distance between the text and the text is equal to or less than a preset threshold value, as one text unit on the basis of the position information of the text.

According to an embodiment of the present application, the data processing unit may further use keys corresponding to the classified form in the course of generating the text units.

According to an embodiment of the present application, the labeling unit may label the text units as the first text to the third text by applying the text units to a natural language processing model.

According to an embodiment of the present application, the relationship identification unit may identify the second text and fourth text which is the first text belonging to a preset distance threshold value, and may map the second text and the first text corresponding to the fourth text.

According to an embodiment of the present application, the relationship identification unit may calculate vector similarity between the second text and the fourth text through a similarity verification model when a plurality of fourth text are identified, and may map the first text corresponding to the fourth text with the highest vector similarity, with the second text.

According to an embodiment of the present application, the misrecognition correction unit may determine misrecognition by calculating similarity between the first text and a representative keyword for a key of training data of the natural language processing model.

A text data structuring method according to an embodiment of the present application may include: a step of extracting text and position information of the text from an image on the basis of OCR; a step of generating text units on the basis of the text and the position information; a step of classifying a form of the image on the basis of the text; a step of labeling the text units as first text to third text corresponding to keys, values, and the like, respectively, on the basis of the classified form; a step of mapping and structuring the second text corresponding to the first text; and a step of determining misrecognition about the first text and correcting the first text determined as misrecognition.

A text data structuring apparatus according to another embodiment of the present invention may include: a data extraction unit which extracts text included in an image and position information of the text on the basis of OCR; a data processing unit which extracts line information included in the image by using the text, the position information, and the image; a form classification unit which classifies a form of the image on the basis of the text; a labeling unit which labels the text as keys or values; and a relationship identification unit which acquires a mapping candidate group including first text, second text, and third text labeled on the basis of the line information, calculates a first similarity score representing meaning similarity between the first text and the third text and a second similarity score representing meaning similarity between the second text and the third text, and decides text to be mapped with the third text among of the first text and the second text on the basis of the first similarity score and the second similarity score.

According to another embodiment of the present application, the form classification unit may classify a form by searching the text in a search engine, which may include a plurality of form samples and label a form most similar to the text.

According to another embodiment of the present application, the labeling unit may classify the text included in the image into text units by applying the image to a natural language processing model, and may label the classified text units as the keys or the values.

According to another embodiment of the present application, the relationship identification unit may acquire the first text, the second text, and the third text included in a first compartment as a mapping candidate group on the basis of the line information.

According to another embodiment of the present application, the relationship identification unit may exclude fourth text included in a second compartment and not the first compartment from the mapping candidate group so as not to be mapped with the first text to the third text on the basis of the line information.

According to another embodiment of the present application, the relationship identification unit may acquire a first text vector by vectorizing the first text, acquire a second text vector by vectorizing the second text, acquire a third text vector by vectorizing the third text, calculate the first similarity score by comparing the first text vector with the third text vector through a similarity verification model, and calculate the second similarity score by comparing the second text vector with the third text vector through the similarity verification model.

According to another embodiment of the present application, the relationship identification unit may compare the first similarity score with the second similarity score to map a key and a value corresponding to the similarity score representing a higher score.

According to another embodiment of the present application, the text data structuring apparatus may further include a misrecognition correction unit which determines misrecognition about the key and corrects the key determined as misrecognition.

According to another embodiment of the present application, the misrecognition correction unit may determine misrecognition by calculating similarity between the first text and a representative keyword for a key of training data of the natural language processing model.

A text data structuring method according to another embodiment of the present invention may include: a step of extracting text included in an image and position information of the text on the basis of OCR; a step of extracting line information included in the image by using the text, the position information, and the image; a step of classifying a form of the image on the basis of the text; a step of labeling the text as keys or values; a step of acquiring a mapping candidate group including first text, second text, and third text labeled on the basis of the line information; a step of calculating a first similarity score representing meaning similarity between the first text and the third text and a second similarity score representing meaning similarity between the second text and the third text; and a step of deciding text to be mapped with the third text among of the first text and the second text on the basis of the first similarity score and the second similarity score.

FIG. 1 is a diagram illustrating a schematic structure of a text data structuring apparatus according to an embodiment of the present invention.

Referring to FIG. 1, the text data structuring apparatus according to the embodiment of the present invention may include a data extraction unit 100, a data processing unit 200, a form classification unit 300, a labeling unit 400, a relationship identification unit 500, a misrecognition correction unit 600, and a database 700, and may extract user-desired information from a received image.

The data extraction unit 100 may extract text and position information of the text included in the image received by a user terminal (not illustrated). The data extraction unit 100 may extract text and position information of the text included in the image on the basis of OCR. For example, the data extraction unit 100 may apply the OCR to an image illustrated in (a) of FIG. 2 to extract an output illustrated in (b) of FIG. 2.

The data processing unit 200 may generate text units on the basis of the text and the position information extracted by the data extraction unit 100. The data processing unit 200 may set the text units on the basis of a distance between a preset length threshold value and a keyword included in the text on the basis of the position information of the text.

The form classification unit 300 may classify a form of the received image on the basis of the text extracted by the data extraction unit 100. The form classification unit 300 may search the text extracted by the data extraction unit 100 in a database 700, in which a plurality of previously registered form samples are stored, to classify a form of the received image by identifying the most similar form to the text.

For example, when the form samples include a first form including text A, B, C, and D and a second form including text A, C, E, and F, and the text extracted by the data extraction unit 100 includes text A, B, and C, the form classification unit 300 will classify the form of the received image into the first form.

The labeling unit 400 may label the text units as first to third text on the basis of the form (form-specific items, etc.) classified by the form classification unit 300. The labeling unit 400 may label text corresponding to a key of the text units as the first text, text corresponding to a value as the second text, and text corresponding to others as the third text.

The labeling unit 400 may apply the text units included in a set group to a text classification model which is a BERT-based natural language processing model to label the text units as a key, a value, and others.

The text classification model is a model trained in advance on the basis of training data labeled as keys, values, or others by a user, and is operated by the labeling unit 400 to label text units included in a group. The text classification model may be trained by transforming training data about characters with a high misrecognition rate such as O-Q in case that text extracted by OCR is misrecognized. For example, when text includes Orange, the text classification model may further perform keyword learning about Qrange as well as keyword learning about Orange.

The relationship identification unit 500 may structure text by mapping the first text and the second text labeled by the labeling unit 400. The relationship identification unit 500 may map the second text corresponding to the first text, that is, a value corresponding to a key, to each other.

The relationship identification unit 500 may perform mapping on the basis of the position information of the first text and the second text. The relationship identification unit 500 may identify the second text and fourth text which is the first text belonging to a preset distance threshold value.

When a plurality of fourth text are identified, the relationship identification unit 500 may calculate vector similarity between the second text and the fourth text through a similarity verification model, and may map the fourth text having the highest similarity based thereon with the second text.

In this case, in identifying the fourth text, the relationship identification unit 500 may assume that the first text has a greater y value or a smaller x value in position information than the second text on the form, and may perform a mapping process.

In addition, in the relationship identification unit 500, when a plurality of second text with the same type is present in one group, all the second text may be mapped with the first text mapped with the leftmost second text or the topmost second text.

The relationship identification unit 500 may set the first text and the second text mapped with the first text into one group, and may map the text about key-value. Accordingly, one group may include a text unit about the key and a text unit about at least one value.

The misrecognition correction unit 600 may determine and correct misrecognition about the first text. The misrecognition correction unit 600 may compare the first text with a representative keyword for the key of the training data of the natural language processing model used in the labeling unit 400. Since the keyword for the key of the training data includes all keywords transformed to prevent misrecognition, misrecognition may be determined by comparing the first text with a representative keyword not transformed among them.

The misrecognition correction unit 600 may calculate similarity between the representative keyword and the first text. When the representative keyword and the first text are not the same as each other and the calculated similarity is equal to or larger than a preset similarity threshold value, the misrecognition correction unit may determine that the first text is misrecognized.

The misrecognition correction unit 600 may correct the first text determined as misrecognition to the representative keyword, and may provide the correction history to the user terminal.

Since the key serves as an indicator of data described in the form, misrecognition of the key acts as a major obstacle in the data structuring process. Accordingly, the misrecognition correction unit 600 corrects the first text corresponding to the key, thereby improving quality of data structuring and reducing work load in review and correction processes.

Figure 3:
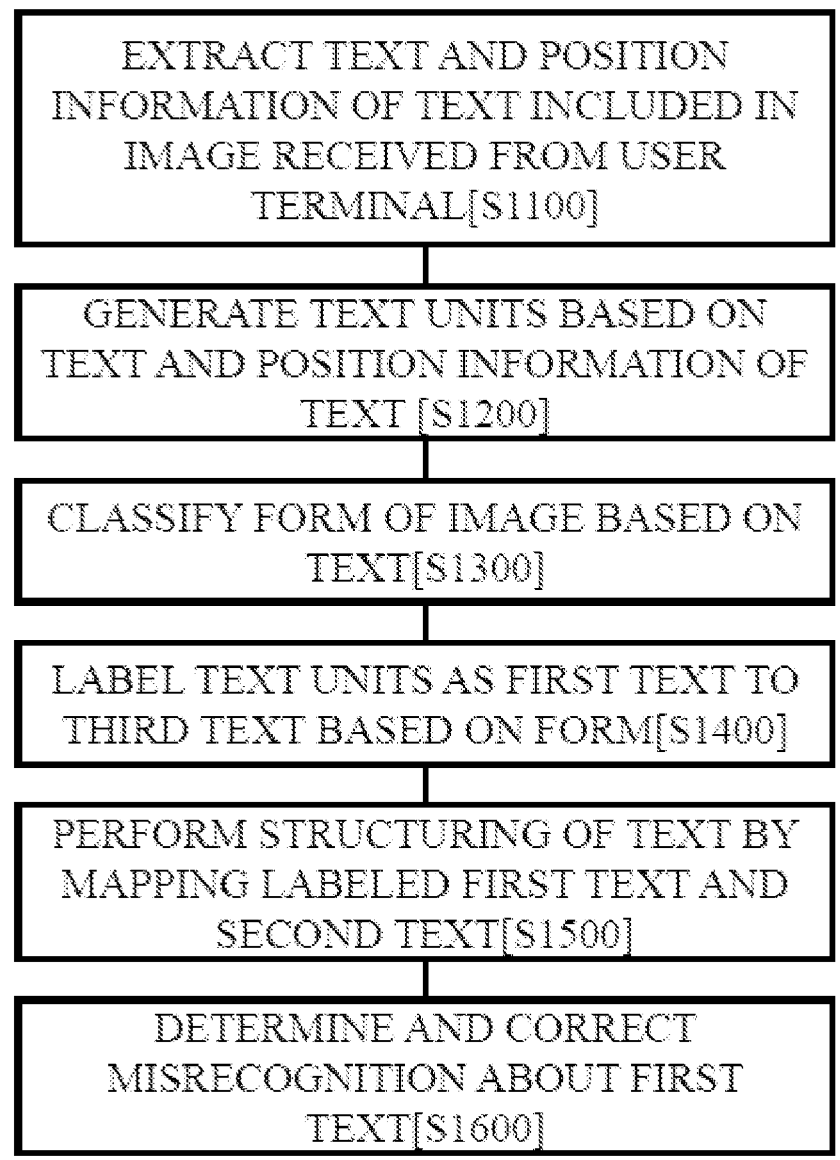
FIG. 3 is a flowchart for explaining a text data structuring method according to an embodiment of the present invention.

FIG. 3 is a flowchart for explaining a text data structuring method according to an embodiment of the present invention. Hereinafter, the text data structuring method will be described with reference to FIG. 3. In the description about the text data structuring method, detailed embodiments overlapping with the text data structuring apparatus described above may be omitted.

In Step 1100, a server may extract text and position information included in an image received from a user terminal. The server may extract text and position information of the text included in the image on the basis of OCR.

In Step 1200, the server may generate text units on the basis of the extracted text and position information. In this case, the text units may be set through a distance between a preset distance threshold value and a keyword included in the text on the basis of the position information of the text.

In Step 1300, the server may classify a form of the image on the basis of the extracted text. The server may search the extracted text in a database, in which a plurality of previously registered form samples are stored, and may identify the most similar form to the text, to classify the form of the image.

In Step 1400, the server may label the text units as the first text to the third text on the basis of the form. The server may label text corresponding to a key of the text units as the first text, text corresponding to a value as the second text, and text corresponding to others as the third text. The server may apply the text units included in a set group to a BERT-based natural language processing model to label the text units as the first text to the third text corresponding to a key, a value, and others.

In Step 1500, the server may perform structuring of the text by mapping the labeled first text and second text. The server may perform mapping on the basis of the position information of the first text and the second text. The server may identify the second text and the fourth text which is the first text belonging to a preset distance threshold value to map the fourth text and the second text. When there are a plurality of fourth text, the server may map the fourth text having the highest similarity on the basis of vector similarity, with the second text.

In Step 1500, in identifying the fourth text, the server may assume that the first text has a greater y value or a smaller x value in position information than the second text on the form, and may perform a mapping process.

In Step 1600, the server may determine and correct misrecognition about the first text. The server may compare the first text with a representative keyword for the key of the training data of the natural language processing model. Since the keyword for the key of the training data includes all keywords transformed to prevent misrecognition, misrecognition may be determined by comparing the first text with a representative keyword not transformed among them.

According to an embodiment of the present invention, in the process of labeling the text, since the labeling is performed by using data in a database in which a user directly resisters a plurality of key expressions, there is a limit in that it takes a relatively large amount of time and cost to construct the key data. Furthermore, according to an embodiment of the present invention, since the text data structuring apparatus has to perform labeling and mapping operations on all generated text units, there is a limit in that the amount of operations is rather high.

In order to solve these, a text data structuring apparatus (FIG. 4) according to another embodiment of the present invention may include a data extraction unit 100, a data processing unit 210, a form classification unit 300, a labeling unit 410, a relationship identification unit 510, a misrecognition correction unit 600, and a database 700.

Figure 4:
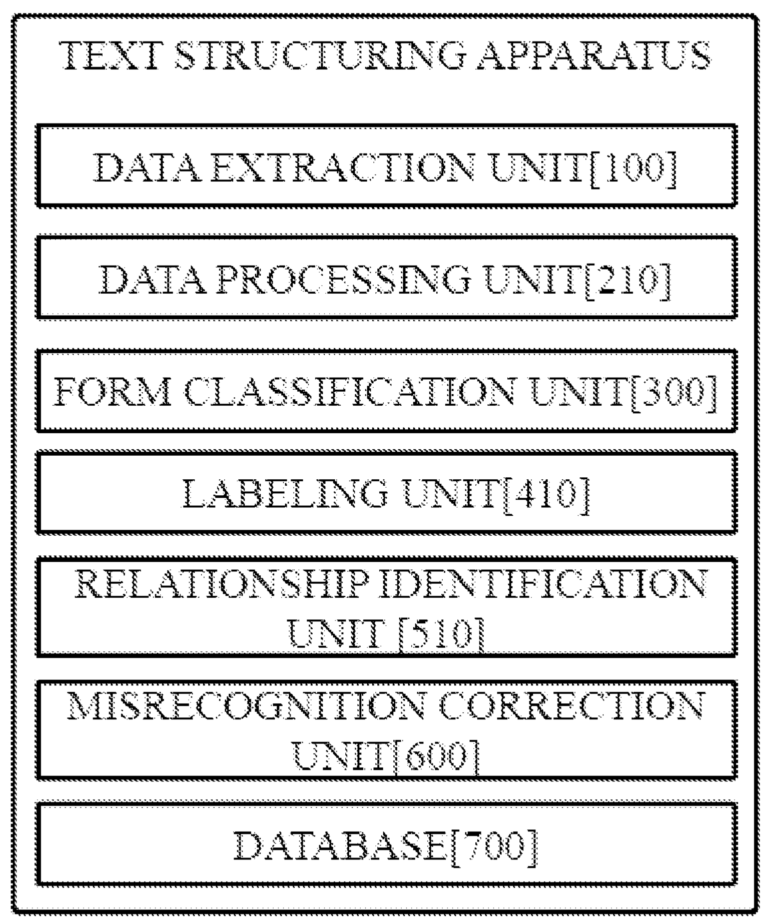
FIG. 4 is a diagram illustrating a schematic structure of a text data structuring apparatus according to another embodiment of the present invention.

The text data structuring apparatus according to another embodiment of the present invention illustrated in FIG. 4 is different in the operations of the data processing unit, the labeling unit, and the relationship identification unit from the text data structuring apparatus according to the embodiment of the present invention illustrated in FIG. 1. Hereinafter, operations of the data processing unit 210, the labeling unit 410, and the relationship identification unit 510 will be mainly described. However, this is only for convenience of explanation, and the operations of the data extraction unit 100, the form classification unit 300, the misrecognition correction unit 600, and the database 700 according to an embodiment of the present invention may also be analogously applied to the present embodiment.

The data processing unit 210 may extract line information included in an image by using text and position information of the text extracted by the data extraction unit 100 and an image original file. The data processing unit 210 may generate text units on the basis of the extracted line information. In addition, the extracted line information may be used to map the text in the relationship identification unit 510.

Furthermore, the data processing unit 210 may extract tilt angle information of the received image on the basis of the extracted line information. For example, the data processing unit 210 may calculate a tilt angle of the received image on the basis of a tilt of the extracted line information, and may extract tilt angle information of the image. In addition, the data processing unit 210 may extract table information (or cell information) on the basis of the extracted line information. In addition, the data processing unit 210 may extract width information, height information, and/or tilt angle information of the image on the basis of the received image. In this case, the text data structuring apparatus 1000 may minimize an influence of noise (e.g., tilt, low quality, etc.) of the received image document on text data structuring by using the information (e.g., line information, table information, width information, height information, and/or tilt angle information of the image) acquired through the data processing unit 210, for the text data structuring. Furthermore, the text data structuring apparatus 1000 may improve accuracy of mapping between text and text by using the information (e.g., line information, table information, width information, height information, and/or tilt angle information of the image) acquired through the data processing unit 210, for text structuring of the relationship identification unit 510 to be described later.

The labeling unit 410 may generate text units of a plurality of text present in the image by applying the image received from the user terminal as input data to a deep learning model, and may classify the generated text units into first to third text. Specifically, the labeling unit 410 may generate (or classify) the text units from extracted text of the received image as input data by using named entity recognition (NER) through a deep learning natural language model, and may assign a label to each of the generated text units.

The labeling unit 410 may generate text units present in the image through a deep learning natural language model, and may add a tag to each of the generated text units. The labeling unit 410 may add tags <KEY-B>, <KEY-I>, <VAL-B>, and <VAL-I> to keywords included in the text units through the deep learning model, respectively. The KEY means a key, the VAL means a value, the B means start, and I means intermediate.

For example, when text includes a keyword of SHIPPER/EXPORTER NO. & DATA INVOICE, the labeling unit 410 may add tags such as SHIPPER/EXPORTER <KEY-B>, NO. & DATA <KEY-B>, and INVOICE <KEY-I> through the deep learning model. This may be a basis which allows SHIPPER/EXPORTER and NO. & DATA INVOICE to be determined as keys.

The labeling unit 410 may apply the NER through the deep learning model to add the tag to each of the keywords as described above, thereby performing labeling to the text.

The labeling unit 400 according to the embodiment of the present application performs labeling by using all the text units determined by the data processing unit 200 as the input data. Accordingly, in the labeling unit 400, operation for labeling is required for every text unit. Meanwhile, the labeling unit 410 according to the present embodiment may generate the text units by using the text included in the received image as the input data, and may perform labeling about the generated text units. Accordingly, the labeling unit 410 may perform labeling about the text units by performing the operation for the received image document, rather than predicting labeling for every text unit, and may improve accuracy of labeling about the text units by performing prediction by image document unit. Furthermore, the labeling unit 410 according to the present embodiment does not perform labeling on the basis of only the text information of the classified text units, but may perform labeling about the generated text units by using surrounding information of the generated text units of the analysis target. Accordingly, it is possible to improve quality of labeling by flexibly performing labeling on the basis of the surrounding information (e.g., 'SHIPPER/EXPORTER' may be labeled as a key (KEY), a value (VAL), or a label (O) which is not a target of interest according to use on the basis of the surrounding information). Furthermore, according to the labeling unit 410 according to the present embodiment, the generation of the text units does not depend on the keys in the database, and the text units are generated through deep learning natural language model, thereby improving usability.

The relationship identification unit 510 may perform text structuring by mapping the first text and the second text labeled by the labeling unit 410. In this case, the relationship identification unit 510 may perform text structuring by further using the line information extracted by the data processing unit 210. Specifically, the relationship identification unit 510 may map the plurality of text labeled by the labeling unit 410 by using the line information extracted by the data processing unit 210. For example, the relationship identification unit 510 may acquire, as a mapping candidate group, the plurality of labeled text included in a predetermined compartment (or common box) by using the line information.

Furthermore, the relationship identification unit 510 may calculate a mapping candidate group by using the width information, the height information, the tilt angle information, and/or the cell information of the image extracted by the data processing unit 210. Specifically, the relationship identification unit 510 may correct noise (e.g., tilt of image) included in the image extracted by the data processing unit 210 by using the width information, the height information, the tilt angle information, and/or the cell information. For example, the relationship identification unit 510 may correct the tilt of the received image by using the width information, the height information, the tilt angle information, and/or the cell information of the image extracted by the data processing unit 210, and may calculate the mapping candidate group on the basis of the corrected image or perform mapping between the first text and the second text. Through this, it is possible to minimize an error caused by the noise of the received image itself and to improve calculation accuracy of the mapping candidate group.

Figure 5:
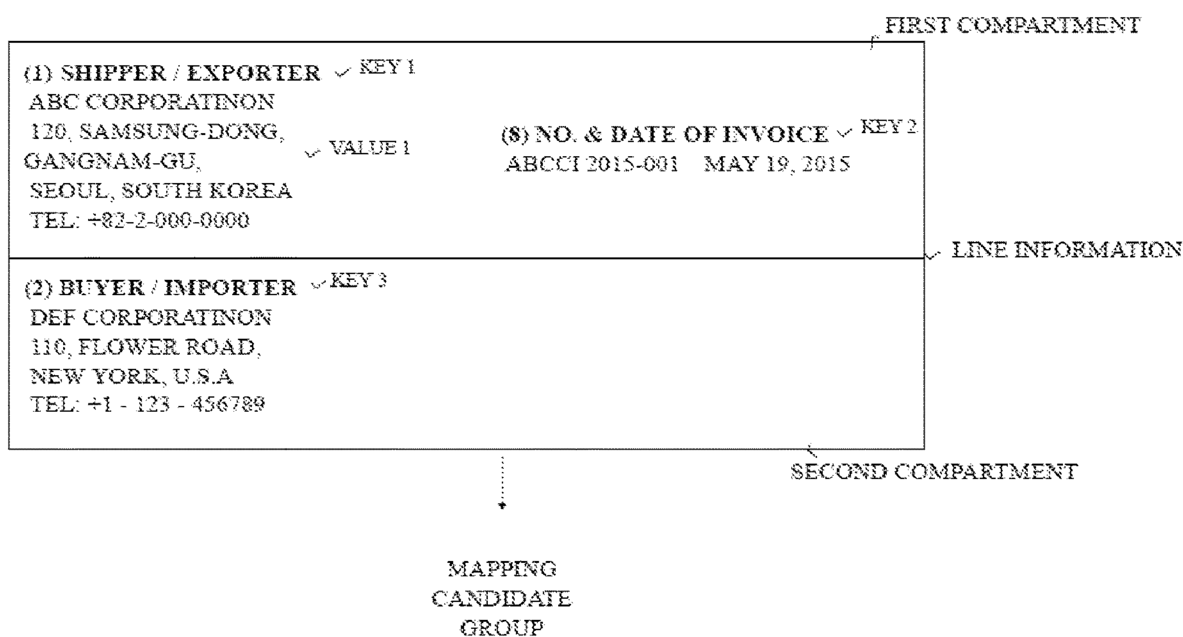
FIG. 5 is a diagram illustrating an aspect of acquiring a mapping candidate group by using line information according to another embodiment of the present invention.

FIG. 5 is a diagram illustrating an aspect of acquiring mapping candidate group by using line information according to another embodiment of the present invention.

For example, the relationship identification unit 510 may acquire compartment information by using line information, and may acquire labeled text (e.g., 'SHIPPER/EXPORTER' (KEY 1), 'NO. & DATE OF INVOICE' (KEY 2), and 'ABC CORPORATION (omitted) TEL: +82-2-000-0000' (VALUE 1)) included in a first compartment as a mapping candidate group. In this case, the relationship identification unit 510 may map a key and a value on the basis of the keys and the values of the plurality of text included in the mapping candidate group. For example, when one key and one value are calculated in the mapping candidate group, the relationship identification unit 510 may map the key and the value included in the mapping candidate group. Meanwhile, the relationship identification unit 510 may exclude the labeled text (e.g., BUYER/IMPORTER (KEY3)) included in the second compartment from the mapping candidate group related to the first compartment so as not to be mapped with the labeled text included in the first compartment.

Meanwhile, when the mapping candidate group includes text labeled as at least one key or text labeled as at least one key, the relationship identification unit 510 may be implemented to perform mapping between text and text included in the mapping candidate group on the basis of the meaning similarity between text and text included in the mapping candidate group.

Figure 6:
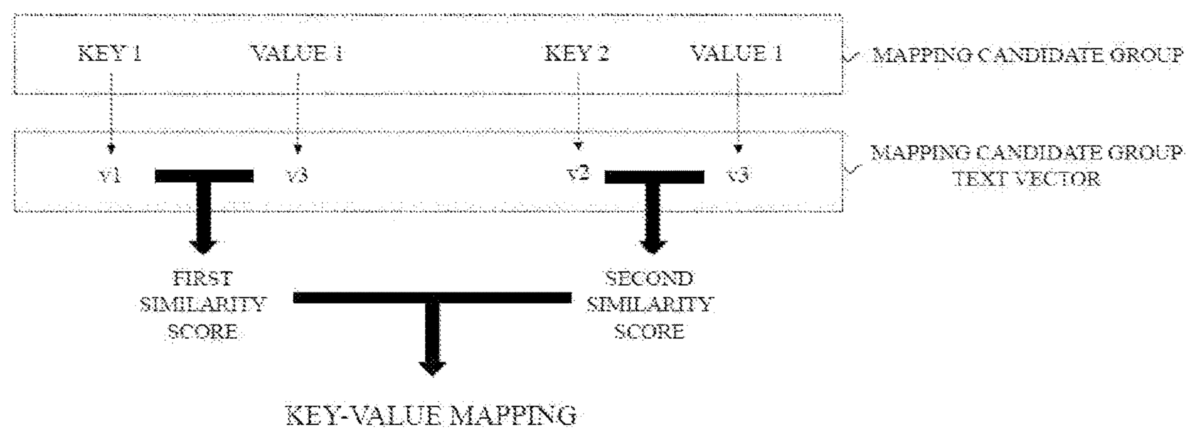
FIG. 6 is a diagram illustrating an aspect of performing mapping between text and text by using line information according to another embodiment of the present invention.

FIG. 6 is a diagram illustrating an aspect of performing mapping between text and text by using line information according to another embodiment of the present invention.

For example, the relationship identification unit 510 may acquire a first text vector (v1), a second text vector (v2), and a third text vector (v3) by vectorizing the first text (e.g., KEY 1), the second text (e.g., KEY 2), and the third text (e.g., VALUE 1) included in the mapping candidate group, respectively.

In this case, the relationship identification unit 510 may calculate a similarity score between text and text through the above-described similarity verification model. For example, the relationship identification unit 510 may calculate a first similarity score between the first text vector and the third text vector through the similarity verification model. In this case, the first similarity score means a value obtained by quantifying meaning similarity between the first text and the third text. For example, the relationship identification unit 510 may calculate a second similarity score between the second text vector and the third text vector through the similarity verification model. In this case, the second similarity score means a value obtained by quantifying meaning similarity between the second text and the third text.

Furthermore, the relationship identification unit 510 may map text and text by comparing the first similarity score and the second similarity score. For example, the relationship identification unit 510 may compare the first similarity score and the second similarity score and map a key and a value corresponding to a similarity score representing a higher score. For example, a value (e.g., VALUE 1 in FIG. 5) related to a subject may have relatively high meaning similarity with a key (e.g., KEY 1 in FIG. 5) related to the subject as compared with a key (e.g., KEY 2 in FIG. 5) related to date. In other words, it is highly probable that the first similarity score between the first text vector (v1) and the third text vector (v3) is calculated to be higher than the second similarity score between the second text vector (v2) and the third text vector (v3). In this case, the relationship identification unit 510 may compare the first similarity score with the second similarity score and map the first text (e.g., SHIPPER/EXPORTER (KEY 1)) and the third text (e.g., ABC CORPORATION (omitted) TEL: +82-2-000-0000' (VALUE 1)) corresponding to the first similarity score representing a higher score.

Meanwhile, the relationship identification unit 510 may be implemented to map a plurality of text on the basis of position information of text and similarity between one text vector and other text vector as described with reference to the relationship identification unit 500 when there is no line information in an image.

According to the present invention, since it is general that line information present in a document classifies text into items, it is possible to improve accuracy in mapping of text by using the line information included in such a document.

Furthermore, according to the present invention, it is possible to perform labeling about text by using a document itself as an input value not a text unit. Through this, it is possible to reduce the amount of calculation of the natural language processing model, thereby improving the speed of text structuring.

Figure 7:
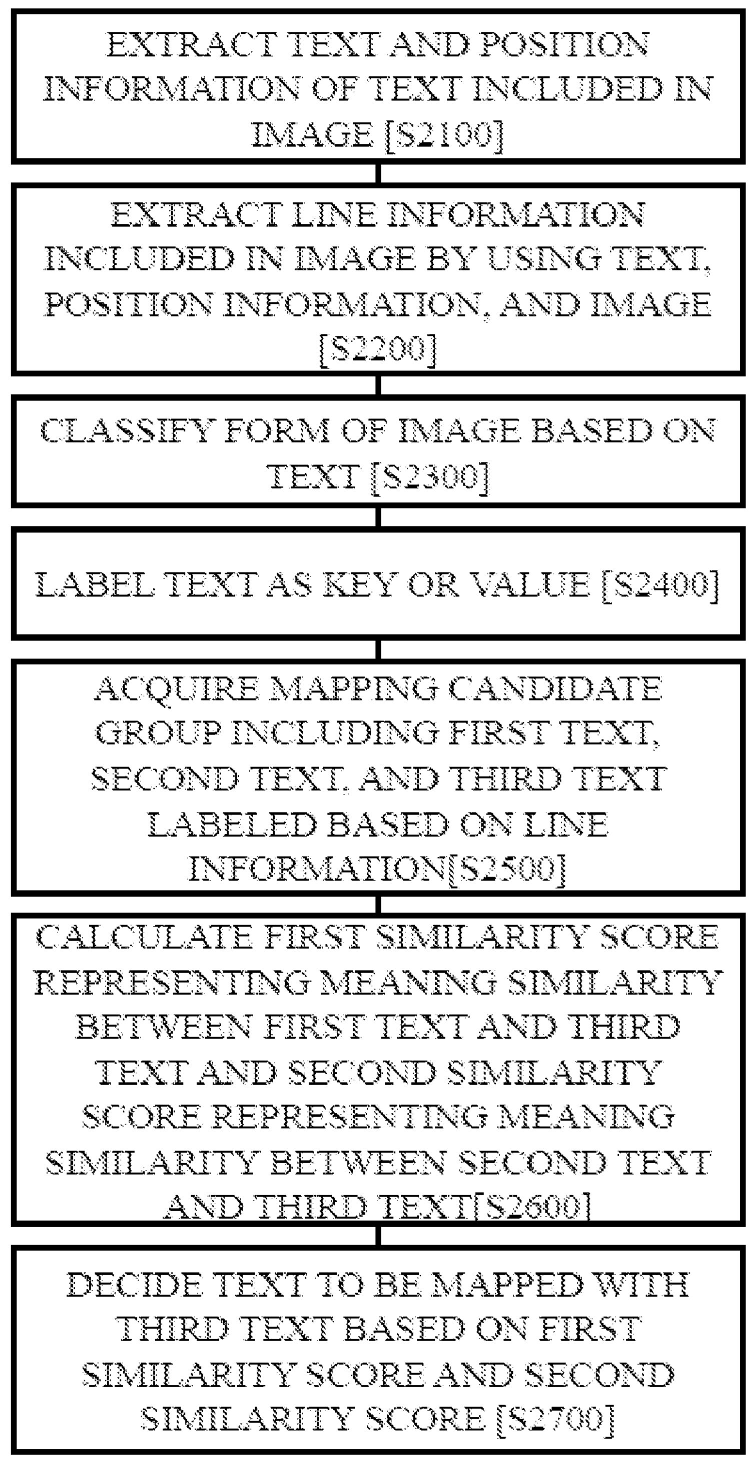
FIG. 7 is a flowchart for explaining a text data structuring method according to another embodiment of the present invention.

FIG. 7 is a flowchart for explaining a text data structuring method according to another embodiment of the present invention. Hereinafter, the text data structuring method will be described with reference to FIG. 7. In description of the text data structuring method, detailed embodiments overlapping with the text data structuring apparatus described above may be omitted.

In Step 2100, a server may extract text and position information of the text included in an image received from a user terminal. The server may extract the text and the position information of the text included in the image on the basis of OCR.

In Step 2200, the server may extract line information included in the image on the basis of the extracted text and position information, and the image.

In Step 2300, the server may classify a form of the image on the basis of the extracted text. The server may search the extracted text in a database, in which a plurality of previously registered form samples are stored, to classify a form of the image by identifying the most similar form to the text.

In Step 2400, the server may label the extracted text as a key or a value. The server may input the image to a BERT-based natural language processing model, and may label the extracted text through the natural language processing model as a label corresponding to a key, a value, or others.

In Step 2500, the server may acquire a mapping candidate group including the first text, the second text, and the third text labeled on the basis of line information. Specifically, the server may acquire the first text, the second text, and the third text included in a common first compartment on the basis of the line information, as a mapping candidate group. Furthermore, the server may exclude fourth text included in a second compartment and not the first compartment from the mapping candidate group of the first compartment so as not to be mapped with the first text to the third text.

In Step 2600, the server may calculate a first similarity score representing meaning similarity between the first text and the third text, and a second similarity score representing meaning similarity between the second text and the third text. Specifically, the server may acquire a first text vector by vectorizing the first text, acquires a second text vector by vectorizing the second text, and acquire a third text vector by vectorizing the third text. In this case, the server may calculate a first similarity score by comparing the first text vector and the third text vector through the similarity verification model. In addition, the server may calculate a second similarity score by comparing the second text vector and the third text vector through the similarity verification model.

In Step 2700, the server may decide text to be mapped with the third text on the basis of the first similarity score and the second similarity score. Specifically, the server may map a key and a value corresponding to a similarity score representing a higher score to each other by comparing the first similarity score and the second similarity score. For example, when the first similarity score represents a higher score than the second similarity score, the server may map the first text corresponding to the key related to the first similarity score and the third text corresponding to the value related to the first similarity score. Meanwhile, when the second similarity represents a score higher than the first similarity score, the server may map the second text corresponding to the key related to the second similarity score and the third text corresponding to the value related to the first similarity score.

Meanwhile, although not illustrated, the text data structuring method according to another embodiment of the present invention may further include a step of determining and correcting misrecognition about a key. In the step of determining and correcting the recognition about the key, the server may determine and correct misrecognition about text corresponding to a key. The server may compare text corresponding to a key with a representative keyword about a key of training data of a natural language processing model. Since the keyword about the key of the training data includes all keywords transformed to prevent misrecognition, it is possible to determine misrecognition by comparing a non-transformed representative keyword among them with the text corresponding to the key.

According to an embodiment of the present invention, it is possible to efficiently perform operation management of image documents through classification of image documents, extraction of text (key and value) in image documents, structuring of text data, correction of misrecognition, and the like. In addition, according to the present invention, it is possible to effectively cope with meta information applied differently according to the loading of training data and the field situation.

According to another embodiment of the present invention, since it is general that line information present in a document classifies text by item, it is possible to improve mapping accuracy of text by using line information included in such a document.

According to still another embodiment of the present invention, it is possible to perform labeling and mapping about text by using a document itself and not text unit as an input value. Through this, it is possible to reduce the amount of calculation of a natural language processing model, thereby improving the speed of text structuring.

The effects of the present invention are not limited to the above-described effects, and effects not mentioned will be clearly understood by those of ordinary skill in the art to which the present invention belongs from the present specification and accompanying drawings.

The embodiments of the present invention disclosed in the present specification and drawings are merely provided for specific examples to easily explain the technical contents of the present invention and help the understanding of the present invention, and are not intended to limit the scope of the present invention. It will be apparent to those of ordinary skill in the art to which the present invention pertains that other modifications based on the technical spirit of the present invention can be implemented in addition to the embodiments disclosed herein.

While the present invention has been described with respect to the specific embodiments, it will be apparent to those skilled in the art that various changes and modifications may be made without departing from the spirit and scope of the invention as defined in the following claims.

What is claimed is:

1. A text data structuring apparatus comprising:
a processor; and
a memory storing instructions executable by the processor,
wherein the processor is configured to:
extract text included in an image and position information of the text on the basis of Optical Character Recognition (OCR),
extract line information included in the image by using the text, the position information, and the image,
classify a form of the image on the basis of the text,
label the text as keys or values by applying the text to a natural language processing model that is trained in advance on the basis of training data of the natural language processing model by transforming training data about characters that have a high misrecognition rate in case that any one of the characters is extracted by the OCR,
acquire a mapping candidate group including first text, second text, and third text labeled on the basis of the line information,
calculate a first similarity score representing meaning similarity between the first text and the third text and a second similarity score representing meaning similarity between the second text and the third text, and
decide text to be mapped with the third text among of the first text and the second text on the basis of the first similarity score and the second similarity score,
wherein the processor is further configured to determine misrecognition about the first text and correct the first text determined as misrecognition,
wherein the processor is further configured to determine the misrecognition about the first text by calculating similarity between the first text and a representative keyword among a plurality of keywords for a key of the training data of the natural language processing model, and
wherein the first text corresponds to the key of the training data of the natural language processing model, and the plurality of keywords for the key of the training data of the natural language processing model include (i) a keyword transformed to prevent misrecognition and (ii) the representative keyword not transformed.

2. The text data structuring apparatus according to claim 1, wherein the processor is further configured to classify a form by searching the text in a search engine, which includes a plurality of form samples and label a form most similar to the text.

3. The text data structuring apparatus according to claim 1, wherein the processor is further configured to classify the text included in the image into text units by applying the image to the natural language processing model and label the classified text units as the keys or the values.

4. The text data structuring apparatus according to claim 1, wherein the processor is further configured to acquire the first text, the second text, and the third text included in a first compartment as a mapping candidate group on the basis of the line information.

5. The text data structuring apparatus according to claim 4, wherein the processor is further configured to exclude fourth text included in a second compartment and not the first compartment from the mapping candidate group so as not to be mapped with the first text to the third text on the basis of the line information.

6. The text data structuring apparatus according to claim 1, wherein the processor is further configured to acquire a first text vector by vectorizing the first text, acquire a second text vector by vectorizing the second text, acquire a third text vector by vectorizing the third text, calculates the first similarity score by comparing the first text vector with the third text vector through a similarity verification model, and calculate the second similarity score by comparing the second text vector with the third text vector through the similarity verification model.

7. The text data structuring apparatus according to claim 1, wherein the processor is further configured to compare the first similarity score with the second similarity score to map a key and a value corresponding to the similarity score representing a higher score.

8. The text data structuring apparatus according to claim 1, wherein the processor is further configured to improve accuracy of mapping between text and text by using information extracted from the image, and
wherein the information extracted from the image includes one or more of the line information, table information, width information, height information, and tilt angle information of the image.

9. The text data structuring apparatus according to claim 8, wherein the processor is further configured to:
add one of tags <KEY-B>, <KEY-I>, <VAL-B>, and <VAL-I> to each of keywords included in each of the text units,
connect keywords with related tags among the tagged keywords, and
label each of the connected keywords with a key or value,
wherein "KEY" means a key, "VAL" means a value, "B" means start, and "I" means intermediate.

10. A text data structuring method in which a server structures text data, the method comprising:
extracting text included in an image and position information of the text on the basis of Optical Character Recognition (OCR);
extracting line information included in the image by using the text, the position information, and the image;
classifying a form of the image on the basis of the text;
labeling the text as keys or values by applying the text to a natural language processing model that is trained in advance on the basis of training data of the natural language processing model by transforming training data about characters that have a high misrecognition rate in case that any one of the characters is extracted by the OCR;

acquiring a mapping candidate group including first text, second text, and third text labeled on the basis of the line information;

calculating a first similarity score representing meaning similarity between the first text and the third text and a second similarity score representing meaning similarity between the second text and the third text; and deciding text to be mapped with the third text among the first text and the second text on the basis of the first similarity score and the second similarity score, wherein the method further comprises determining misrecognition about the first text and correcting the first text determined as misrecognition, wherein the determining of the misrecognition about the first text comprises determining the misrecognition about the first text by calculating similarity between the first text and a representative keyword among a plurality of keywords for a key of the training data of the natural language processing model, and wherein the first text corresponds to the key of the training data of the natural language processing model, and the plurality of keywords for the key of the training data of the natural language processing model include (i) a keyword transformed to prevent misrecognition and (ii) the representative keyword not transformed.

* * * * *